(12) United States Patent
Zaver

(10) Patent No.: US 10,572,654 B2
(45) Date of Patent: Feb. 25, 2020

(54) METHOD FOR A REPEATABLE CREATION OF A RANDOM FILE

(71) Applicant: Vadim Zaver, London (GB)

(72) Inventor: Vadim Zaver, London (GB)

( * ) Notice: Subject to any disclaimer, the term of this patent is extended or adjusted under 35 U.S.C. 154(b) by 275 days.

(21) Appl. No.: 15/402,822

(22) Filed: Jan. 10, 2017

(65) Prior Publication Data

US 2017/0200003 A1 Jul. 13, 2017

Related U.S. Application Data

(60) Provisional application No. 62/277,063, filed on Jan. 11, 2016.

(51) Int. Cl.
*G06F 21/46* (2013.01)
*H04L 9/06* (2006.01)

(52) U.S. Cl.
CPC ............ *G06F 21/46* (2013.01); *H04L 9/0643* (2013.01); *H04L 2209/08* (2013.01)

(58) Field of Classification Search
None
See application file for complete search history.

(56) References Cited

U.S. PATENT DOCUMENTS

| | | | | |
|---|---|---|---|---|
| 6,668,323 B1* | 12/2003 | Challener | ............... | G06F 21/31 380/286 |
| 2003/0012382 A1* | 1/2003 | Ferchichi | ............. | H04L 63/062 380/270 |
| 2003/0131266 A1* | 7/2003 | Best | ......................... | G06F 21/46 713/184 |
| 2004/0003241 A1* | 1/2004 | Sengodan | ............... | H04L 63/08 713/168 |
| 2004/0158746 A1* | 8/2004 | Hu | .......................... | G06F 21/41 726/8 |
| 2007/0104326 A1* | 5/2007 | Feigenbaum | ........ | G06F 21/6227 380/44 |
| 2009/0024852 A1* | 1/2009 | Yonezawa | ............. | H04L 9/3013 713/180 |
| 2009/0249069 A1* | 10/2009 | Daskalopoulos | ... | H04L 63/0869 713/169 |
| 2009/0260077 A1* | 10/2009 | Zhu | .......................... | G06F 21/34 726/19 |
| 2009/0279691 A1* | 11/2009 | Farrugia | ............... | H04L 9/3093 380/28 |

(Continued)

*Primary Examiner* — Kaveh Abrishamkar

(57) ABSTRACT

Method for repeatable creation of random file enables to create and recreate random files at different places, different times and on different devices. Random files are based on aliases, which can contain any text, including specific information, such as serial number, start date, expiry date, etc. Random files can be used for generations of strong and unique passwords. The strength of the password doesn't depend on alias, so any alias will result in equally strong and unique password.

Browser, using the method, would be able to register the user to any resource, by generating a password, using resource's URL as alias, and afterwards automatically log user in using same URL for generating the password again. Users can communicate securely by sending alias in plaintext together with ciphertext encrypted with password.

IoT devices can establish master, slave, partner, alien relationship and communicate securely without human introduction.

20 Claims, 7 Drawing Sheets

(56) References Cited

U.S. PATENT DOCUMENTS

| | | | | |
|---|---|---|---|---|
| 2010/0031328 A1* | 2/2010 | Hodgkinson | ........... | G06F 21/33 |
| | | | | 726/5 |
| 2012/0252414 A1* | 10/2012 | Ishidoshiro | ........... | H04L 63/083 |
| | | | | 455/411 |
| 2014/0310519 A1* | 10/2014 | Yoo | ..................... | G06F 21/6209 |
| | | | | 713/165 |
| 2017/0011214 A1* | 1/2017 | Cavanagh | ................ | G06F 21/46 |
| 2017/0147826 A1* | 5/2017 | Farkash | .............. | G06F 21/6218 |

* cited by examiner

19 User navigates to a page, which is secured with a password

20 Browser, or other software used, sends the URL of the page to the embodiment of the invention

21 The embodiment of the invention generates strong and unique password, based on the given URL, and passes back to the browser the password

22 Browser logs in the user to the page in the background, using the generated password, without user typing anything

FIG.3

METHOD FOR A REPEATABLE CREATION OF A RANDOM FILE

CROSS-REFERENCE TO RELATED APPLICATIONS

This application claims the benefit of Provisional Patent Application 62/277,063, filed 2016 Jan. 11 by the present inventor.

FEDERALLY SPONSORED RESEARCH not applicable

SEQUENCE LISTING OR PROGRAM

The object code for the first embodiment of the disclosed technology is available for Android, Microsoft Windows, iPhone and iPad.
Android: https://play.google.com/store/apps/detailsfiid=uk.co.hexameter.SuperPassword (published 19 Jan. 2015).
iPhone and iPad: https://itunes.apple.com/us/app/super-password/id963544550?mt=8 (published 10 Aug. 2015).
Microsoft Windows at: http://www.amazon.co.uk/s/ref=nb_sb_noss?url=search-alias%3Daps&field-keywords=superpassword (published 19 May 2015)

BACKGROUND

This application relates to repeatable creation of random files.

PRIOR ART

There are numerous prior art technologies, which allow to generate a random file, either a truly random or a pseudo random. But when there is a need to regenerate the same random file again, none of the prior art technologies are able to do it. So far random been a synonym for unmanageable. However, there is often a need to generate the same random file at different times, or/and at different geographical places, or/and at multiple devices.

There are numerous prior art technologies, in particular cryptographic hashes, which allow to generate a string based on a file. In case of cryptographic hashes, the string is always of the same size and is a unique signature of the file. If the file is a truly random, the generated string will be a truly random too, providing a good hash function is used.

The need in manageable generation and regeneration of random strings is demonstrated by evolution of password requirements. Computers are the primary tool for cracking passwords and fast evolution of computers means, that the passwords, will have to evolve at the same pace, as computers' power evolves, to provide security to the users.

Moore's law implies that computer speed doubles roughly every 1.5 years. Therefore, every 18 month passwords need to be strengthened by one bit to withstand brute force attacks from a single computer.

In 1966, a strong password was 8 characters long. In 2017, taking into account evolution of computers, a strong password has to be at least 14 characters long, to be able withstand brute force attack from a single computer with one central processing unit (CPU).

Computers' CPUs have been used for cracking passwords since beginning of the computer era. Since 2007, it became possible to use for cracking passwords, not only computers' CPUs, but also computers' graphics processing units (GPUs). Using a GPU for cracking passwords unleashes far more processing power, roughly 100 times more than the CPU on the same computer has. Therefore, a secure password has to be at least 16 characters long to withstand an attack from a single computer, which is using one CPU and one GPU.

People or organizations, which involved in cracking passwords do not limit themselves by using just one computer. They are likely to have access to super computers or arrays of computers. Some large arrays of computers have tens of thousands of workstations working on a single task. Therefore, modern secure passwords need to address this challenge too. As a result, a strong password has to be at least 18 characters long to withstand an attack from a medium sized array of computers. The length is valid for perfectly random passwords, which use full range of ASCII characters.

There is another threat for secure passwords—fast evolving the world's data storage capacity. It evolves extremely fast—90 percent of all world's data were produced and stored in the past two years. Evolving of data storage capacity allows to create bigger and bigger rainbow tables, which can be used to crack passwords of any length, unless a password is truly random and sufficiently long.

Currently, there are four problems with generating a password. Firstly, computers are not designed to generate random passwords or do random things. Surely, computers can generate long and seemingly random strings, but these strings are pseudo random. Even a very long password, if it is not truly random, likely to be vulnerable.

Secondly, people generally don't like to memorise and type long passwords, containing lots of random letters, numbers, symbols and punctuation, for instance such as this one: 52V11aP7_bYn1_VHDXfN|U]F<*^{4,S}. Imagine memorizing, recalling and typing passwords for hundreds of resources, which a user needs to access. Humans prefer to use meaningful words, which they can remember, perhaps with some additional information, such as a memorable date. But any such a password can be cracked in a matter of seconds using a large enough rainbow table.

Thirdly, currently a password is not linked in any way to the resource it is supposed to unlock. If such a password is lost, it cannot be regenerated, because it doesn't carry a hidden meaning that it is a unique key for a unique resource.

Lastly, currently a password doesn't authenticate the user, to whom the password belongs. When a password is generated, it is just a sequence of characters, but not a sequence of characters, which could have been produces by the only one user and bears his unique signature.

Security comes from true randomness of passwords. And true randomness doesn't come from the machines. Numerous technological attempts have been made to create truly random files, such as by making a user randomly move the mouse for long time, or by listening to atmospheric noise. All of them require human input or use some data feed, which either can be exploited or doesn't achieve true randomness. Despite 65 years long, tremendously fast progress of computer technologies, humans still have to listen to atmospheric noise, or manually move a mouse around to create a decently random file. And humans are still stick to passwords, which a human brain is able memorize and recall.

ADVANTAGES

Thus several advantages of one or more aspects of the disclosed technology.

The disclosed technology enables generation and re-generation of random files, without using the computer's processor random instructions, therefore the disclosed technology is not dependent on hardware.

The disclosed technology enables generation and regeneration of random files at different times, at different places and on different devices.

The generated random file, is linked to an alias, and if the alias contains an additional information, such as an address, a date or a serial number, then the random file will be linked with that specific information.

Other advantages of one or more aspects are that the disclosed technology takes out the human factor out of dealing with passwords. This is beneficial to humans, but it even more beneficial to machines, as they would become the first-class internet citizens and would be able to generate passwords, explore the Internet, communicate directly with other machines, while maintaining hierarchy.

These and other advantages of one or more aspects of the disclosed technology will become apparent from a consideration from the ensuing description and accompanying drawings.

These and other advantages of one or more aspects will become apparent from a consideration of the ensuing description and accompanying drawings.

SUMMARY

Disclosed herein is a method, which enables a repeatable generation of random files, using key files, with or without user input, where the generated file is based on an alias. The random file can be regenerated again by entering the same alias.

DRAWINGS

Figures

FIG. 3 is a flow chart of the additional embodiment (1) of the disclosed technology, which enables users logging in, without typing anything.

REFERENCE NUMERALS

Figure 1:
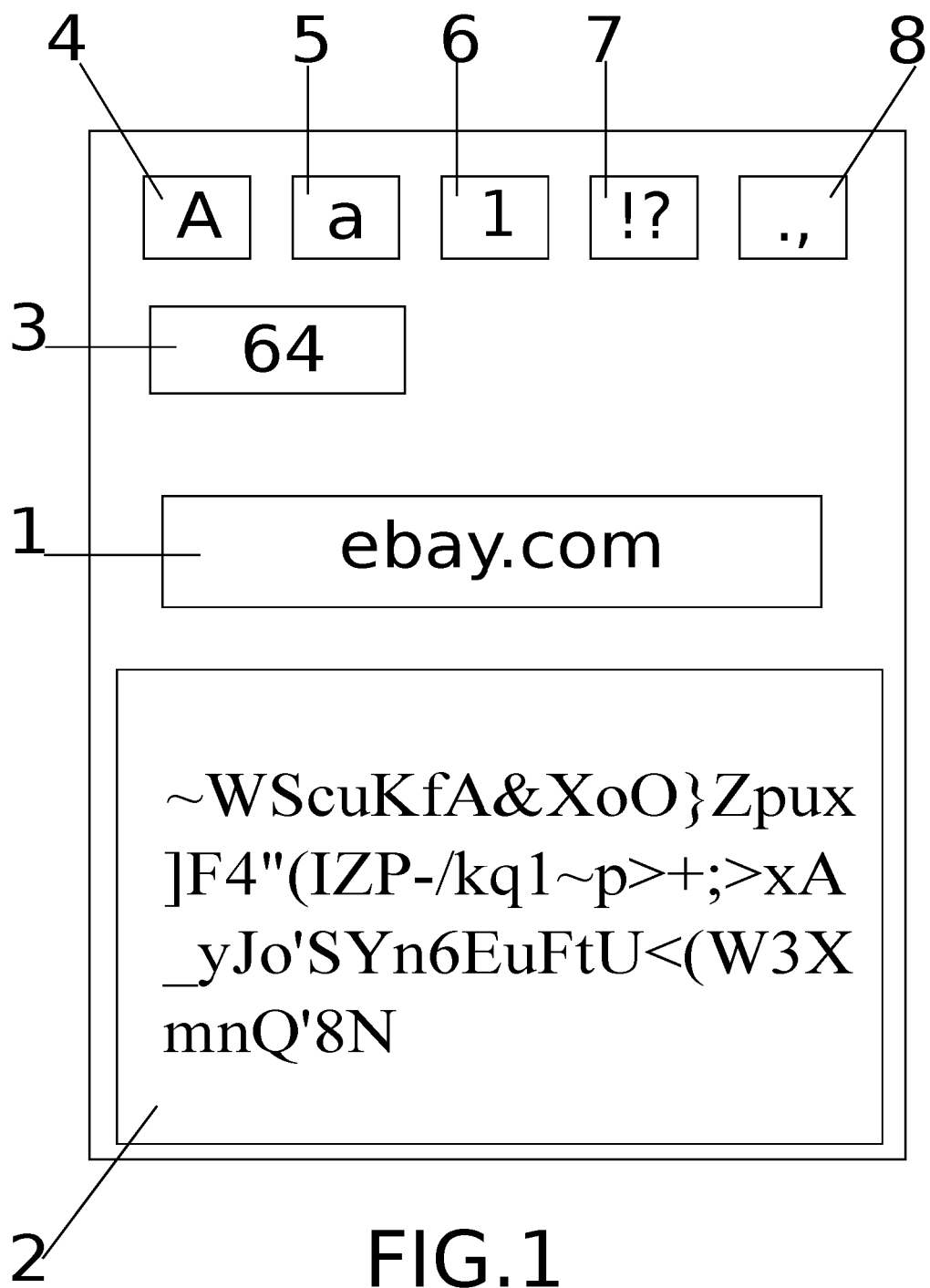
FIG. 1 is a schema of graphical user interface of the first embodiment of the disclosed technology.

1—a text box for input of an alias
2—a text box for output of a password
3—a text box for a required length of a password
4—button selector for upper case letters
5—button selector for lower case letters
6—button selector for digits
7—button selector for symbols
8—button selector for punctuation
9—start
10—first use selector
11—generate key files
12—user enters an alias for a password
13—alias for strong password is hashed
14—the hash is used to determine the unique order of key files
15—the key files are processed in specified order
16—result is mapped to the user required character set
17—the strong password is passed to the user
18—end
19—user navigates to a page, which is secured with a password
20—browser, sends the URL of the page to the additional embodiment (1) of the disclosed technology
21—the additional embodiment (1) of the disclosed technology generates strong password based on the URL
22—browser logs in the user to the page
23—user navigates to an account creation page
24—the page requires user to provide username, email, and password
25—the additional embodiment (2) of the disclosed technology generates a password using the URL as alias
26—storage containing default values for username and password
27—default data and the password entered
28—account created
29—user
30—resource
31—user creates an account
32—sufficient number of passwords with embedded serial or a date created
33—passwords hashed and the hashes stored at the resource
34—user logging in
35—a password generated using the resource's URL and serial or the current date
36—user logs in with the generated password
37—password is hashed and checked if the hash matches one in the storage
38—delete user password
39—user logged in
40—run out of passwords, generate new batch
41—a device encrypts a command with the password, generated with an alias and sends out the encrypted command and the alias in plaintext
42—all connected devices will receive the message
43—each device will attempt to decode the message using the supplied alias
44—if the key files of receiver match the key files of the sender, then the message decoded and the command is executed
45—if the key files don't match the key files of the sender, the message is not decoded and dropped
46—top level device
47—lower level devices
48—broadcast a message
49—receive a message
50—ignore messages
51—broadcast a message at the same level

Glossary of Technical Terms

Ciphertext—is the result of encryption performed on plaintext using an algorithm, called a cipher.

CPU—A central processing unit (CPU) is the electronic circuitry within a computer that carries out the instructions of a computer program by performing the basic arithmetic, logical, control and input/output operations specified by the instructions. The term has been used in the computer industry at least since the early 1960s. Traditionally, the term "CPU" refers to a processor, more specifically to its processing unit and control unit, distinguishing these core elements of a computer from external components.

Cryptographic hash—cryptographic hash function result.

Cryptographic hash function—a special class of hash function that has certain properties which make it suitable for use in cryptography. It is a mathematical algorithm that maps data of arbitrary size to a bit string of a fixed size (a hash function) which is designed to also be a one-way function, that is, a function which is infeasible to invert. The only way to recreate the input data from an ideal cryptographic hash function's output is to attempt a brute-force search of possible inputs to see if they produce a match.

Frankenstein—Frankenstein's monster, sometimes known as Frankenstein, is a fictional character, thought to be made of parts of bodies of dead people, whose fictional creator was Victor Frankenstein. The monster first appeared, without any name, in Mary Shelley's 1818 novel Frankenstein.

GPU—A graphics processing unit (GPU) is a specialized electronic circuit designed to rapidly manipulate and alter memory to accelerate the creation of images in a frame buffer intended for output to a display. Modern GPUs are very efficient at manipulating computer graphics and image processing, and their highly parallel structure makes them more efficient than general-purpose CPUs for algorithms where the processing of large blocks of data is done in parallel.

Hash—result of a hash function.

Hash function—a hash function is any function that can be used to map data of arbitrary size to data of fixed size.

Hashing—applying a hash function to a file or text.

Hexadecimal—in mathematics and computing, hexadecimal (also base 16, or hex) is a positional numeral system with a base, of 16. It uses sixteen distinct symbols, most often the symbols 0-9 to represent values zero to nine, and A, B, C, D, E, F (or alternatively a, b, c, d, e, f) to represent values ten to fifteen.

The Internet of Things (IoT)—the internetworking of physical devices, vehicles (also referred to as "connected devices" and "smart devices"), buildings, and other items embedded with electronics, software, sensors, actuators, and network connectivity that enable these objects to collect and exchange data.

Plaintext—unencrypted information, as opposed to information encrypted for storage or transmission.

Rainbow table—a precomputed table for reversing cryptographic hash functions, usually for cracking password hashes. Tables are usually used in recovering a plaintext password up to a certain length consisting of a limited set of characters. It is a practical example of a space/time trade-off, using less computer processing time and more storage than a brute-force attack which calculates a hash on every attempt, but more processing time and less storage than a simple lookup table with one entry per hash.

Salt—in cryptography, a salt is data that is used as an additional input to a one-way function that "hashes" a password or passphrase. The primary function of salts is to defend against dictionary attacks or against its hashed equivalent, a pre-computed rainbow table attack.

Sha-512—SHA-2 (Secure Hash Algorithm 2) is part of a set of SHA-2 (Secure Hash Algorithm 2) cryptographic hash functions designed by the National Security Agency (NSA). It returns 512 bits' digests.

URL—a Uniform Resource Locator (URL), commonly informally termed a web address is a reference to a web resource that specifies its location on a computer network and a mechanism for retrieving it.

DETAILED DESCRIPTION

Description—First Embodiment

The first embodiment of the disclosed technology, is a user driven software application, as illustrated in FIG. 1, with a text box for input of an alias 1, a text box for output of a password 2, a text box for the required length of the password 3, and buttons, with which a user can select groups of characters, to use in the password—upper case letters 4, low case letters 5, digits 6, symbols 7 and punctuation 8.

Figure 2:
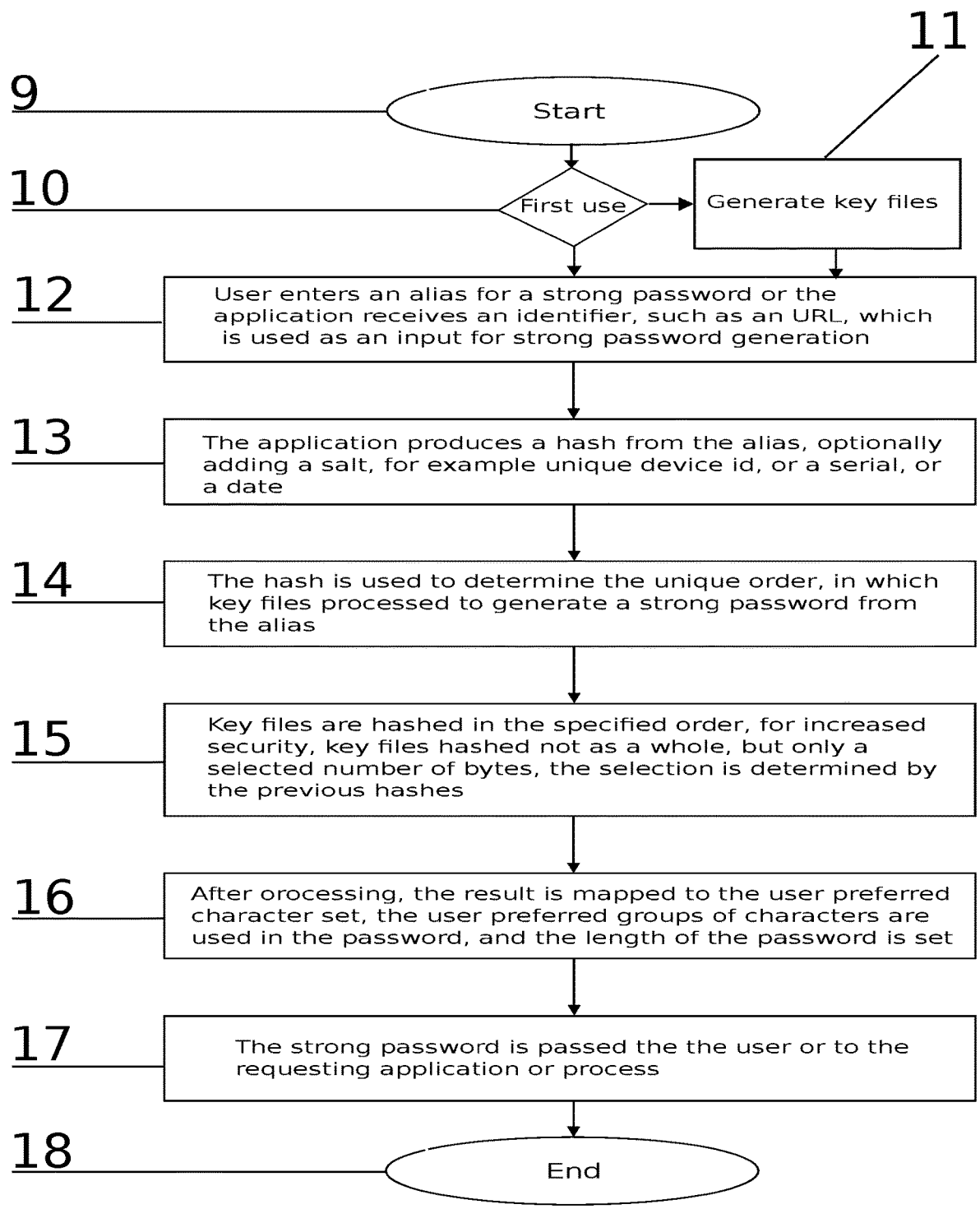
FIG. 2 is a flow chart of the first embodiment of the disclosed technology.

As illustrated in FIG. 2, at start 9, the software process determines, whether it is the first use or not 10. At the first use of the software, a set of unique key files is generated 11. The key files produced by generating the required quantity of random numbers, one by one, and then creating a file filled with these random numbers. The resulted file can be a text file or a binary file. Theoretically, a key file can be of any length higher than one byte. The length of a key file is only limited by the security requirements and hardware power. As practice shows, key files with length of less than 512 bytes, are less secure. And key files with length of over 1 megabyte are difficult to process on low end devices, because of high memory requirements. Key files sized 8 kb, 16 kb and 32 kb are good candidates, as they large enough for security purposes and fast to process even on low end mobile phones. The first embodiment of the disclosed technology uses 16 kb key files.

The number of key files can be any and the number is only limited by hardware. The process of converting an alias to a password, involves shuffling the order in which the key files are processed, and therefore the number of key files should be sufficient for security purposes. Also, to simplify processing, the number of key files, preferably, should be divisible by two, and therefore 64, 128 and 256 are good candidates for the number of key files on low end mobile phones. The first embodiment of the disclosed technology uses 128 key files. The number of combinations resulting in shuffling of 128 key files is equal 128! (factorial of 128) and is $3.8^{215}$, which is an incredible large number. This number guarantees the uniqueness of the generated password. For example, each person on the planet can generate a 64 characters long password for "www.ebay.com", using an "ebay.com" as an alias, and all generated passwords will be unique, strong, and there will be no duplicate passwords generated.

In addition to generated key files set, a user can add his own key files, such as images, videos and other types of files, as means to an additional security. The user might keep them in a separate location on the device, or on a removable media.

The first embodiment of the disclosed technology makes heavy use of cryptographic hash functions or hashes, which in short, can be described, as one way functions. You can easily generate a hash, which is a short string filled with letters and digits, from "ebay.com", which, in case of Sha-512, the hash will be "43A711632267A817045A63A4055D8FFB3D86EDC CC507A491A04DCAF122B18B9 70903E2C02A88C59A9CEDB26FD56C67A82BA17 CE706DBE776EF9EB97DAD7612 FB". But it is practically impossible to calculate from the hash, what the original text or file was (in our case it was text—"ebay.com").

There are many cryptographic hash functions, but the first embodiment of the disclosed technology uses only Sha-512. All references in the description of the disclosed technology, which are related to hashing, hash, cryptographic hash mean that Sha-512 is used.

A user enters an alias for generation of a password 12. The alias for the password is hashed 13. It can be hashed on it's own, or with additional information. The additional information may include, for example a salt, such as device id, so that the same password couldn't be regenerated on a different device. The additional information may include the alias parameters, comprising a serial number, a start date, an expiry date. For example, if the passwords are to change yearly, then the current year is added to the alias. Once the year has changed, the password will change as well.

The resulted hash will always be the same, if the alias and the additional information, both stay the same. This hash is used to shuffle the key files to determine the order in which the key files will be processed 14. The shuffling or changing sorting order of the files can be done in a multitude of ways.

One such a way, used by the first embodiment of the disclosed technology, is to create a table with two columns. First column will contain the hashes, which produced by hashing concatenation of the key file hash and the alias hash. The second column will contain all key files' hashes. The table is then sorted by the first column, and the second column will contain shuffled key files hashes, by which the key files are found and processed one by one.

Now, the key files are shuffled and they can be processed in this unique for each password's alias order 15. The simplest way, for which protection is sought, is to get a hash of each key file, in order they were lined up during the shuffle, and add these hashes to a file. If user defined key files exist, then they also should be hashed and the output added to the file. The result is a long and unique string of letters and numbers.

Another way to process the key files, which is used in the first embodiment of the disclosed technology, and for which protection is sought, is building a, so called, Frankenstein file. Instead of hashing key files and adding hashes to a file, it is possible cut off pieces out of each of the key files, and add these pieces to a new file. In this option, there could be one or more key files, from which one or more pieces are copied out. This will create a new random file, made of pieces of the key files, I call it a Frankenstein file.

A hash of the alias will tell the beginning copying off point and the end copying off point. It is done by using a function, which processes the alias's hash, and returns a number, which is a sum of the hash's double hex numbers. The sum range is from 0 to 16384 (the length of a key file).

The same function is used on the hash of concatenated hash of the key file, which is processed first, and the alias's hash. Two uses of the function returns two numbers ranging from 0 to 16384. The smaller number becomes the starting point, and the bigger number becomes the end point for copying a piece out of the key file, which is processed first.

Then the first key file will have a piece of it copied and added to Frankenstein, but before that, this piece will be hashed. And the function is firstly applied to the piece's hash, and then to the hash of the concatenated hashes of the piece's hash and the key file's hash. Two numbers, which are returned by the function, will determine copying off points for another piece to be copied from the second key file. This operation is repeated on all 128 key files.

As the result of processing, there will be a unique file, build from random pieces of the key files, what I call a Frankenstein file.

Copying randomly sized pieces of key files instead of using whole key files tremendously increases randomness of the random file. The first embodiment of the disclosed technology uses 16 kb files which contain 16384 bytes of data. If a piece is exactly 16384 bytes in size, there is only one possible location for it inside the key file, as the size of the piece is equal to the size of the key file. If the size of the piece is 16383 bytes, then the piece could be in two possible locations inside the key file. If the size of the piece is 16382 bytes, the number of possible locations increases to three, and so on. One-byte piece has 16384 possible locations inside the key file. Copying single (one piece per one key file) randomly sized pieces from 128 key files of 16384 bytes' size gives $10^{539}$ possible combinations, which makes resulting random file a very random one, despite that all the key files may be a pseudo random ones.

The resulting random file is hashed with a cryptographic hash function. The Sha-512, returns 64 double hexadecimal numbers ranging from zero to 255 (16×16), or 32 quadruple hexadecimal numbers ranging from 0 to 65536 (256×256). The range from 0 to 255 corresponds with the total number of ASCII characters (256), and the range from 0 to 65536 corresponds with the number of characters in Unicode plain (65536). The choice of the cryptographic hash function depends on the required password length.

If the user needs a password, which is longer than 64 characters, then the Frankenstein file can be divided into parts and the parts would be hashed as described above;

or a different hash function used, which results in desired number;

or the key files processed again in different order;

or one or more of the key files added or removed from the key file set, and the set is processed again;

or another set of key files added, which produce desired password length.

The last step, before the final password is produced, is adjustment of the password length and removing from the password the characters not required by the user 16.

Different resources accept different password lengths, ranging from 8 to 128 characters. Also different resources require that only certain groups of characters to be present in a password. So for a resource, which accepts passwords with maximal length of 20 characters, made only of upper case and low case letters, the password, 64 characters long, which contains full range of 256 ASCII characters will not be valid. The password needs to be adjusted to user requirements in three steps:

First step is elimination of unwanted characters. As the password uses full range of ASCII or Unicode characters, these firstly need to be grouped according to the user preferences. For the Western Latin-1 character set user, the groups would be upper case letters, low case letters, digits, symbols and punctuation.

Plus, the additional characters, which are required by the resource the user logging in, but not part of the selected by the user groups of characters.

Minus additional characters which are forbidden by the resource the user is logging in, but are part of the selected by the user groups of characters.

These additional cases are needed, because the common rules defining which characters can be part of a password, and which can not, do not exist, and each resource has its own rules regarding which characters must be in a valid password, and which must not.

In case of ASCII, the task is to map a set of 64 numbers, ranging from 0 to 255 to a set of numbers ranging for example from 0 to 32 (upper case letters). The task of mapping a larger set of numbers to a smaller set of numbers well described in prior art, and can be solved in multitude of different ways. One such a way, used in the first embodiment of the disclosed technology, is to increase the smaller set the larger set size, by repeatedly adding the characters from the smaller set, to the smaller set itself, until the smaller set is equal in size with the larger set.

Second step is the reduction of the password's length according to user requirements. This requires removal of redundant characters from the password, until the password length is equal to the required by the user password length.

The last step, is to check whether all required characters are present in the final password. Some resources require for example at least one digit to be present in the password. But all digits might have been cut off during the trimming of the password to the required length. If this the case, the password needs to be analyzed, to see how different groups of characters are represented in the password, and the digit, which had been cut off, has to be brought in, and replace the character at the end of the password, which is safe to replace. After that, the password can be passed to the user 17.

The password lengths, the required character groups for different resources are difficult to remember, and need to be stored in a safe way. The safest way, which excludes guessing of the alias and the password, is take a sample hash in the middle of key files processing. In the first embodiment of the disclosed technology, there are 128 key files. After processing 64 key files, a salt is added to the result, the result hashed, and the hash stored together with the preferences for the password, such as required password length, start date, expiry date, serial number, void or valid, the character set the password uses, character groups the password uses. Whenever a password is produced, the software process can calculate a hash in the way described above, then check if there is a match, and if there is one, then apply saved password settings to the final password. If there is no match, new set of settings is saved. After this, the first embodiment of the disclosed technology is ready to create another password or terminate 18.

Operation—First Embodiment

A user wants to log in into www.ebay.com

EBay accepts passwords which are between 8 and 64 characters long, and contain upper case, low case letters, digits, symbols and punctuation.

The user enters ebay.com as an alias in the text box 1.

If the password for the alias ebay.com is produced for the first time, the user needs to select the password length 3, then select whether to use upper case 4, low case letters 5, digits 6, symbols 7, and punctuation 8, or use the default values.

The choice will be saved and in future entering ebay.com as an alias will be sufficient to generate the password.

The user presses return key on the device keyboard, and the password is produced, copied to the clipboard and displayed in the text box 2.

The user pastes the password and logs into www.ebay.com

Description—Additional Embodiment (1)

The additional embodiment (1) of the disclosed technology, for which protection is sought, is an automated logging in system, which enables a user access resources, which require logging in, without typing anything, as illustrated in FIG. 3.

The additional embodiment (1) of the disclosed technology is essentially the first embodiment of the disclosed technology, configured to receive an alias from a browser, generate a password using the alias, and return the password to the browser.

Using the disclosed technology, a strong password can be generated using a weak alias. The alias can be any string, containing any characters, from any character set. The alias can be the URL of the resource, to which user needs to log in. Whenever user navigates to a page, secured with a password 19, a browser will pass to the additional embodiment (1) of disclosed technology the URL 20.

The embodiment of the disclosed technology will generate a password, using the URL as an alias, and pass the generated password to the browser 21.

The browser will log the user in, without the user ever typing anything 22 or possibly even seeing the log in page.

Description—Additional Embodiment (2)

Figure 4:
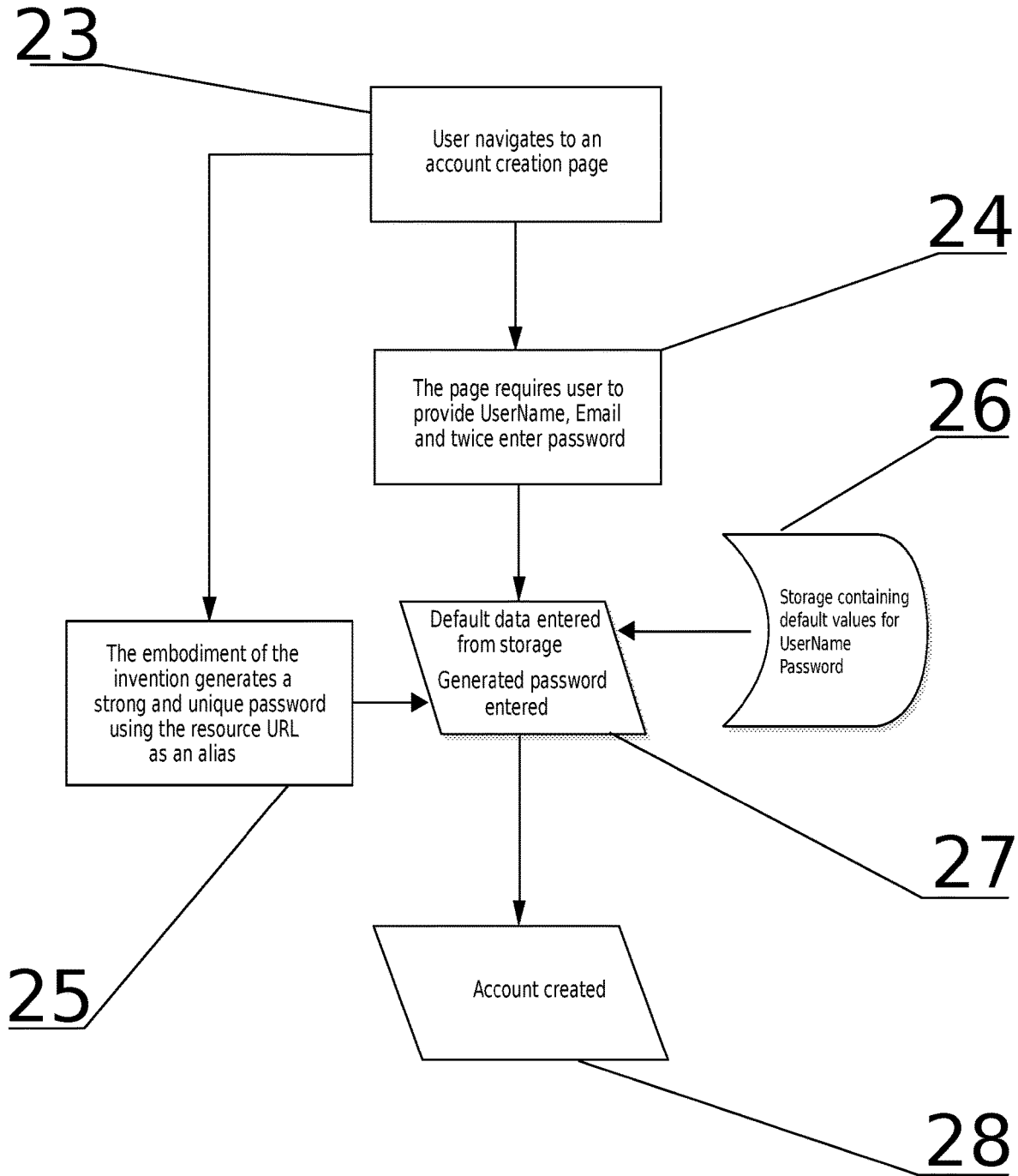
FIG. 4 is a flow chart of the additional embodiment (2) of the disclosed technology, which enables automatic account creation.

The additional embodiment (2) of the disclosed technology, for which protection is sought, is automation of creating of Internet accounts, which is illustrated in FIG. 4.

Essentially, the additional embodiment (2) of the disclosed technology is the first embodiment of the disclosed technology, with added browser and data storage capabilities.

To fully automate creation of Internet and other password protected accounts, a user needs to provide a valid password. All other information, provided during creation of an account, comprising name, surname, address, email, date of birth, nickname, is reusable, and can be kept in the browser's, or the operating system's, or the embodiment's storage 26.

When a user navigates to an account creation page 23, which needs the user's name, user's email, and a password for successful account creation 24. The additional embodiment (2) of the disclosed technology will enter the user's default user name, and default email from the storage 26, and after that will generate a password, based on the resource's URL 25.

The required data and the password 27 entered, and an account created 28, without user typing anything.

Instead of going to the account creation page, the whole process of creating an account can be done in the background, while user waits for a page to load. User would click on a link to the password protected resource, without yet having an account for the resource, and by the time the page is loaded, the user already will be registered.

Description—Additional Embodiment (3)

Figure 5:
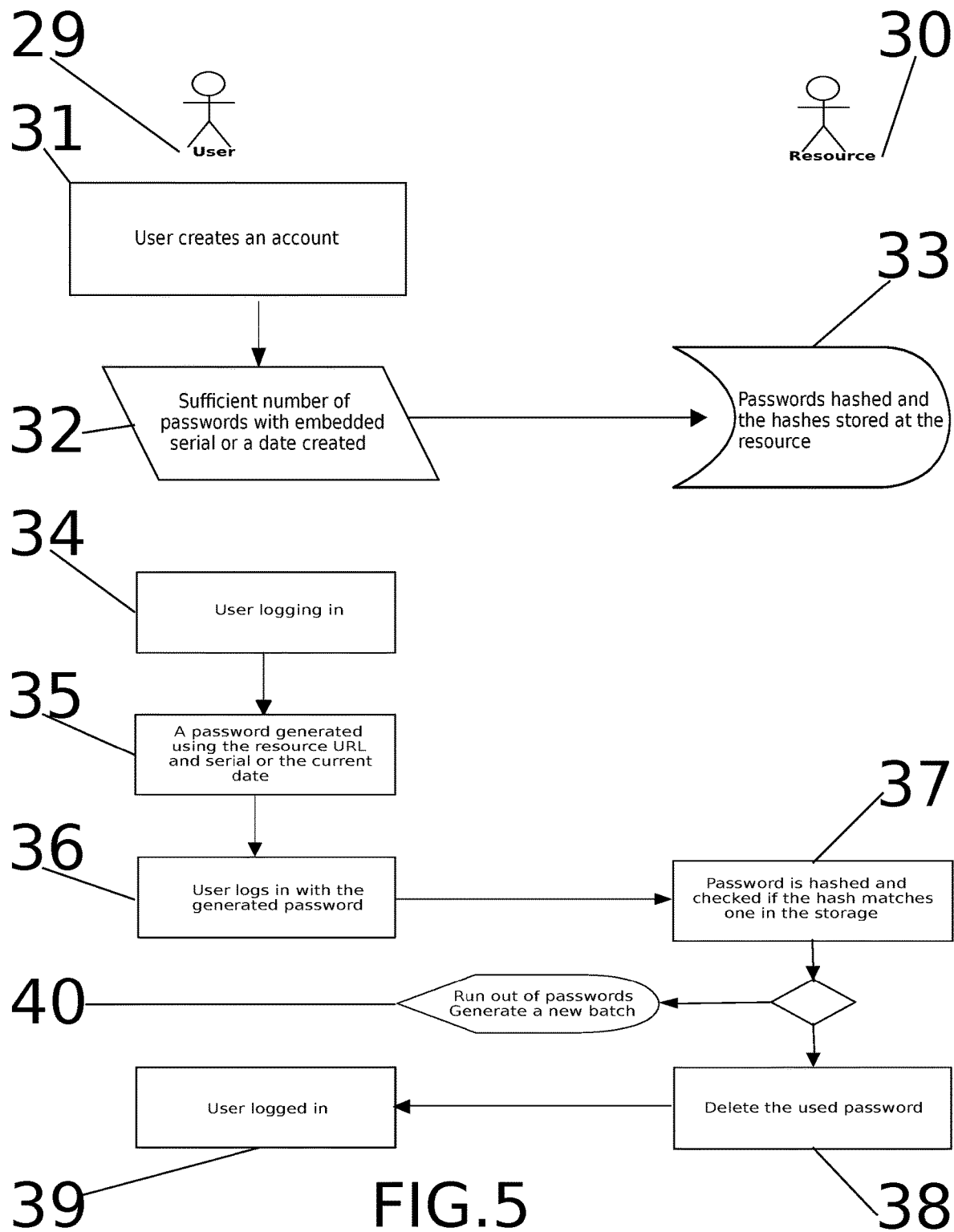
FIG. 5 is a flow chart of the additional embodiment (3) of the disclosed technology, which enables use of disposable passwords.

The additional embodiment (3) of the disclosed technology, for which protection is sought, is a security system with disposable passwords, as illustrated in FIG. 5.

Currently, a user creates a profile and specifies a password, which, might or might not, expire within certain time span. Because the specified password often has a long life, sometimes even decades, the longer it used, the greater is possibility of it to be compromised.

The additional embodiment (3) of the disclosed technology solves the problem of long lasting passwords, by making passwords disposable. Essentially, the additional embodiment (3) of the disclosed technology is the first embodiment of the disclosed technology, configured to produce not single passwords, but batches of passwords. Every password in the batch will share the same alias, but each password in the batch will have a serial number added to the alias, before the password is produces.

Currently, resources 30 allow users 29 to create an account 31 and choose a password. The password is hashed, and hash is kept in the resource's database 33. It is impossible to find from the stored hash, what the password is. When the user logs in, he types the password, the resource hashes it again, and then compares with the stored hash. If there is a match, then the resource allows the user in.

The additional embodiment (3) of the disclosed technology, when a user 29 creates an account 31, would generate not a single password, but a sufficiently large number of passwords 32, to allow the user, to be able logging in into the resource 34 for adequately large number of times. The passwords will be treated by the system exactly the same way as a single password, with one difference—after use, the hash will be deleted from the system 38, serial counter incremented, and the password couldn't be used again. When the number of hashes kept by the system becomes low, then the system will ask the user to generate more passwords 40.

Generating a password will be exactly the same, as described above, with one extra detail—a serial number or/and a date, will be added 35 before, after or instead of salt. A serial number will allow users to log in 36 using a password with serial number, such as 000001 embedded first time, when next time the user will login, the user will use a password with embedded serial number, such as 000002.

The resource will check, if the supplied hash of the password has a match in the resource's storage 37. If there is a match, then the matched password will be deleted from the storage 38 and user logged in 39.

If the storage will run low on stored passwords' hashes, the resource will ask the user to generate another batch of disposable passwords 40.

Embedding a date (with or without a serial) in a password will work slightly different in the additional embodiment (3) of the disclosed technology. When generating passwords, a date will be embedded into each generated password, and the date will be passed to the resource, together with the password. The resource will store a hash of the password and the date. This will be the password expiry date. The password's start date will be the previous password's expiry date. Only between these dates, the password will be valid.

Description—Additional Embodiment (4)

Figure 6:
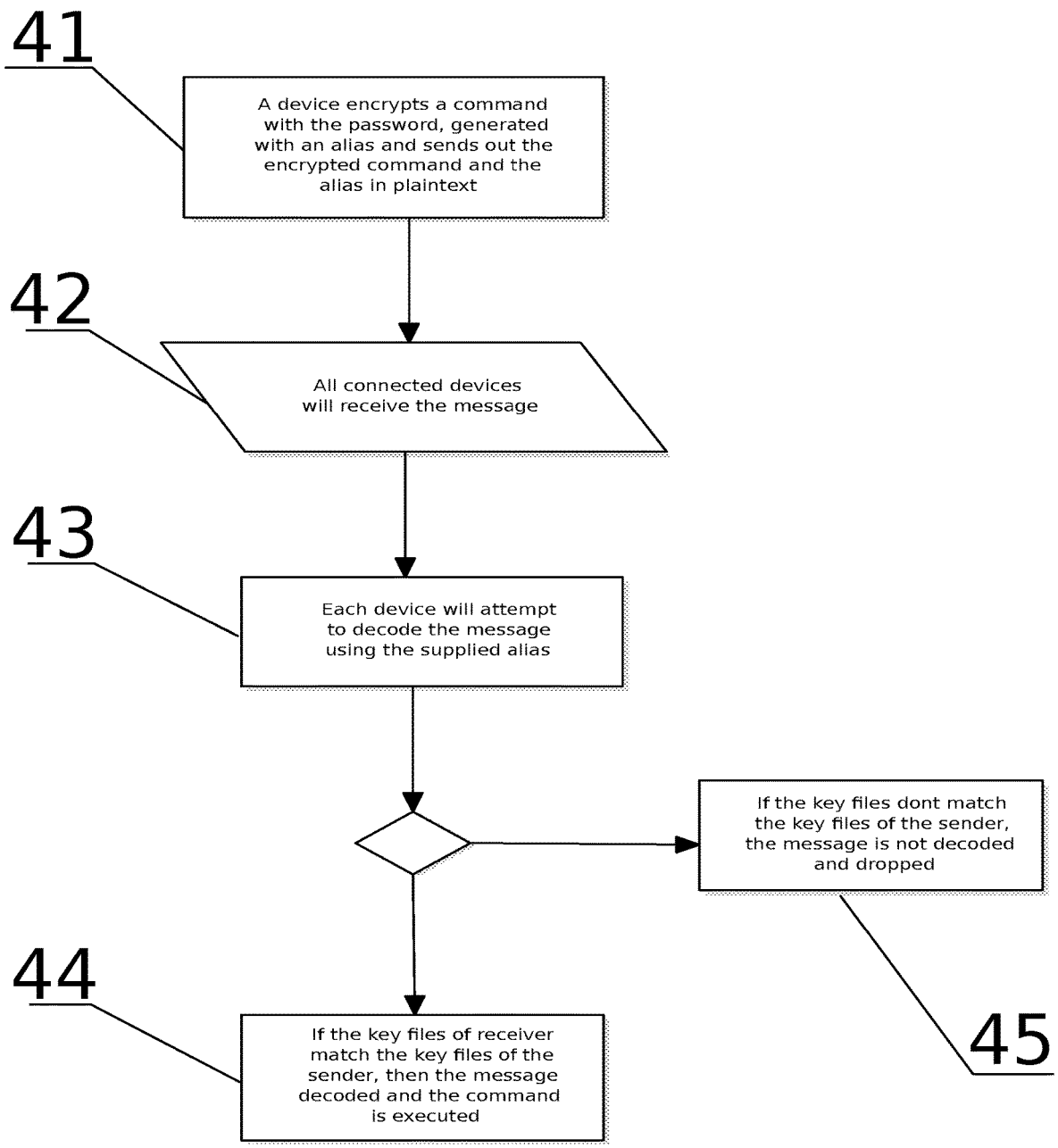
FIG. 6 is a flow chart of the additional embodiment (4) of the disclosed technology, which enables devices to communicate with messages, where the message is encrypted with a password, which was generated with an alias, and the alias is sent in plaintext, together with the message.

The additional embodiment (4) of the disclosed technology, for which protection is sought, are secure communications, as illustrated in FIG. 6, where the alias for a password is sent in plaintext, together with a message. The message is encrypted with the password, generated using the alias.

A device will encrypt a command for other devices with the password, based on a simple alias, and send it out together with the alias 41.

All recipients 42, will try to execute the encrypted command 43, by attempting to generate the password using the supplied alias 43, but only those, which have the right key files, will succeed 44, and will be able to execute the command. The rest of recipients will drop the message 45.

The embodiment of the disclosed technology is vital for the Internet of Things, where a multitude of devices, produced by different manufacturers, in different countries, using different standards would need to communicate with each other securely.

Description—Additional Embodiment (5)

The additional embodiment (5) of the disclosed technology, for which protection is sought, is secure communications of Internet of Things. Soon number of smart embedded devices will outgrow number of computers and mobile phones. All these devices need to communicate electronically, and these communications need to be secured. Using the owner's key files, these devices can communicate via the Internet and perform tasks using the owner's credentials, without the owner's involvement.

Because of large number of Internet of Things (IoT) devices, and need for their intercommunications, there will be hierarchy of devices, where one device (master) can command to another (slave), but not the other way around. For example, a user might want an IoT house's entry door lock (master) to switch off lights (slave), when the user leaves, but the user certainly doesn't want the lights (slave), to be able, to unlock the door (master).

Except the hierarchy, there should be boundaries between groups of devices, and the devices in one group (partners) shouldn't be able to talk to or understand the devices in other groups (aliens) or vice versa. The neighbour's door shouldn't be able to switch your lights on.

These rules—hierarchy and boundaries of IoT devices are implemented as follows.

Figure 7:
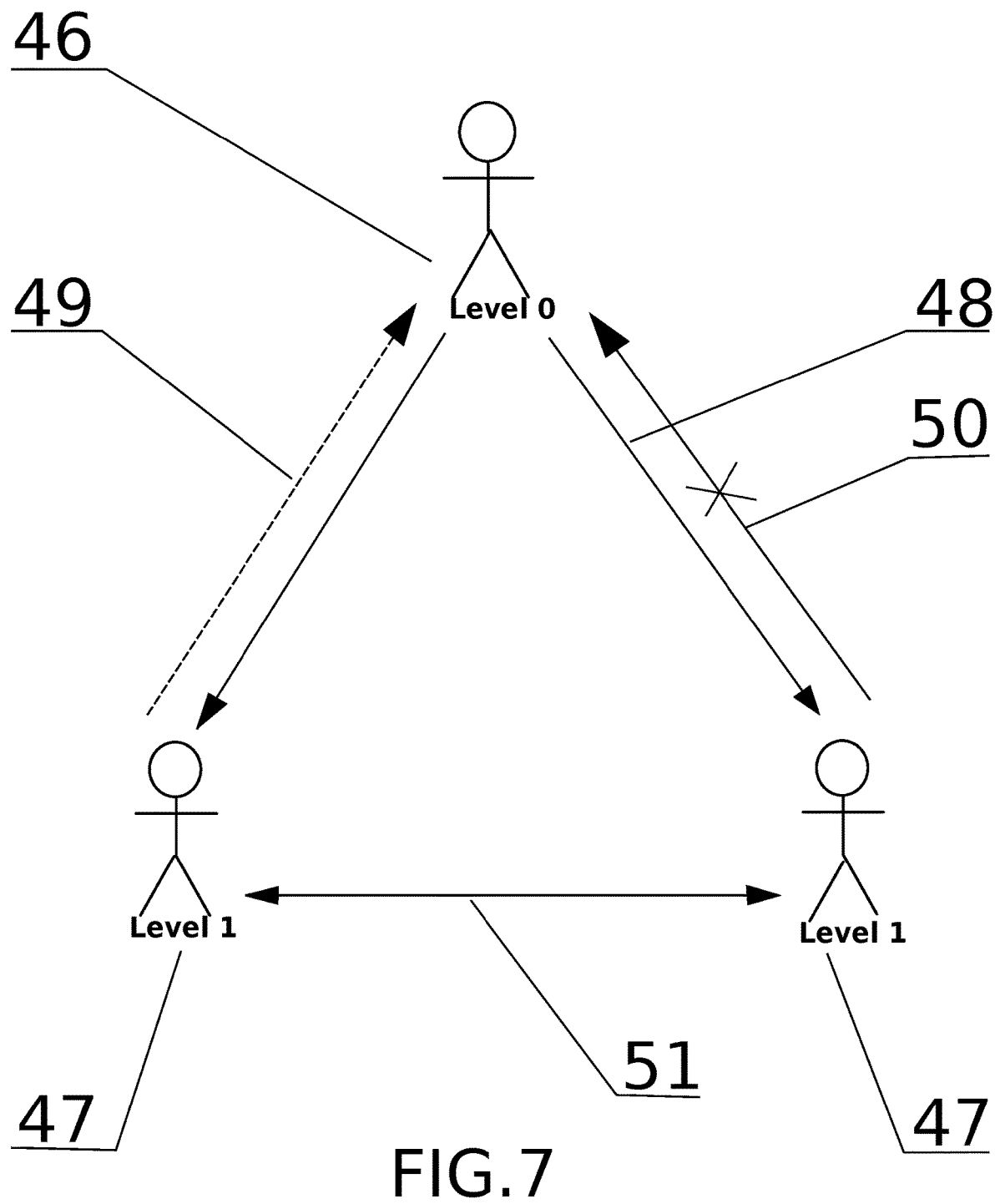
FIG. 7 is a flow chart of the additional embodiment (5) of the disclosed technology, which enables security and hierarchy in communications between electronic devices.

Hierarchy is implemented, as illustrated in FIG. 7, by the top level device 46 having full set of key files, and each level down 47, will have lesser, but sufficient for security purposes number of key files. So for a hierarchy with 16 levels, top level device will have 128 key files, a device on the lower level 127 key files and a device on the lowest level will have 114 key files. All devices will share 114 key files and will be member of the same group (friends).

Top level device (master) 46 can broadcast messages 48 to devices on the same level (partners) or any level below (slaves), as it has full set of key files. Top level device will broadcast messages to all devices (friends), indicating it uses 112 key files. It will send messages to devices on the same level (partners), indicating it uses 128 key files, and messages to the immediate slaves (one level below), indicating it uses 127 key files. Devices from outside the group (aliens) won't be able to understand the messages.

The devices on lower level 47 can send and receive messages from the same level 51 (partners) and lower levels 48 (slaves).

The devices on lower level (slaves) 47 can send messages to upper level (master) 46, indicating the number of key files used, but as these messages are encrypted with lower number of key files (127). The upper level device (master) 46 might be configured to ignore the messages from slaves at all 50 (ignore command coming from the lights to unlock the door) or receive the messages from slaves, but treat them differently 49 (if the lights been switched on in a locked house, then call the police).

Boundaries are implemented by:
either the whole group having the same set of key files (114 out of 128), which would allow only devices with the set, to communicate with each other;
or the whole group having a common key file, in the set of key files, which is common only to members of the group, and only devices, which are having the key file will be able to communicate with each other.

The user can limit the resources/devices/URLs to which smart embedded devices can connect, by limiting list allowable of resources/devices.

It is to be expressly noted that, within the scope of this application, the various aspects, embodiments, examples and alternatives, and in particular the individual features thereof, set out in the preceding paragraphs, in the claims and/or in the following description and drawings may betaken independently or in any combination. For example, features described with reference to one embodiment are applicable to all embodiments, except where such features are incompatible.

While the disclosed technology has been described in terms of particular embodiments and applications, in both summarized and detailed forms, it is not intended that these descriptions in any way limit its scope to any such embodiments and applications, and it will be understood that many substitutions, changes, and variations in the described embodiments, applications and details of the method and system illustrated herein and of their operation can be made by those skilled in the art without departing from the spirit of the disclosed technology.

While my above description contains many specificities, these should not be construed as limitations on the scope, but rather as an exemplification of several embodiments thereof. Many other variations are possible.

Accordingly, the scope should be determined not by the embodiments illustrated, but by the appended claims and their legal equivalents.

CONCLUSION, RAMIFICATIONS AND SCOPE

Random files can be used in many industries, including, but not limited to, security, communications, electronics, finance. Most important property of a random file is its true randomness, and if the random file is large enough, then the file becomes a unique.

The disclosed technology supports variations of process. Two most important stages of generating a random file are the shuffling of the key files and creating a Frankenstein file by copying pieces of the key files into the Frankenstein file. Both of these operations are crucial for creating a new, truly random file, but where the requirements for speed of processing are the top priority and the true randomness is not a priority requirement, then one of the operations can be dropped, and the result would still be satisfactory for many purposes.

A plurality of key files can be substituted with a single key file, from which a plurality of pieces is copied to create a Frankenstein file.

The disclosed technology allows to use meaningful words, phrases and even URLs as password aliases. The first embodiment of the disclosed technology will generate a strong and unique password using the alias entered by the user or for a given URL. The strength of the generated password doesn't depend on the alias, but only on the user requirements and requirements of the resource for which the password is generated. A simple alias will result in an equally strong password, as a long and complex one.

Users, for security purposes, must use strong and unique passwords. The strong and unique passwords are long, difficult to recall and tedious to type. So users sometimes end up using weak, short passwords, which are easy to remember and type, but also easy to crack. The disclosed technology solves the problem for users, allowing users to use a simple, easy to recall and easy to type alias, based on which, at least one embodiment of the disclosed technology can generate strong and unique password.

The disclosed technology is going one step further and allows secure electronic communications between electronic devices, with or without the user's involvement. Currently, when a user needs to log in, he or she needs manually type a password. The disclosed technology allows to avoid the typing altogether. When a user needs to log in to a resource, for example "ebay.com", the resource URL "ebay.com" can be used as an alias to generate a password. The browser, without the user's involvement, will pass the resource URL to the embodiment of the disclosed technology, and after that the browser, without the user's involvement, will receive a strong and unique password, and log the user in, using the password, automatically. Users of electronic devices spend up to half an hour each day, logging in, recalling, typing, re-typing and resetting passwords, which results in sixty billion man-hours of the lost productivity each year worldwide.

The first embodiment of the disclosed technology ensures strength and uniqueness of generated passwords. Instead of using a password like john1975 for ebay.com, a user now can type "ebay.com" to the embodiment, and get a strong password similar to this: "~WScuKfA&XoO}Zpux]F4" (IZP/kq1~p>+;>xA_yJo'SYn6EuFtU<(W3XmnQ'8N.", which is incredibly strong by today's security standards. The password above uses the Western Latin-1 character set's uppercase and low case letters, symbols and punctuation— in total 92 characters. The password complexity is $92^{64}$, which is roughly equal to $2^{410}$. According https://www.my1login.com/resources/password-strength-test/ the time required to crack the above password is 9 billion trillion trillion trillion trillion trillion trillion trillion trillion years.

Let's apply the Moore law to see how computers' CPU power changed. If we start in 1966, then there is 51-year gap between 1966 and 2017. Therefore, computer CPU power roughly increased $2^{(51/1.5)}$ times or 17179869184 times since 1966. The first embodiment of the disclosed technology enables generation of passwords, which are 128 characters long, and which will be still strong and unique in 3256 (in 1240 years' time) even if the Moore's Law continue to work at the present pace. This is $33^{st}$ century technology.

Rainbow tables would not be able to crack passwords generated by the first embodiment of the disclosed technology. They would need to use a data storage which at least is $10^{248}$ big. For example, the world current data storage is $10^{23}$ and the number of atoms in the Universe is $10^{80}$.

The disclosed technology supports different methods of operations. It can be either user driven or automatic.

The disclosed technology supports different embodiments. It can be a standalone embodiment, or an embodiment embedded in the operating system, or an embodiment embedded in a browser, or an embodiment embedded in a third party application. An embodiment of the disclosed technology can be a part of a computer, a mobile phone or another electronic device, but also can be a dedicated device.

Possible modifications of the disclosed technology comprise changing the number of key files, changing the number of key files, changing the hashing method.

Possible different environments of use for the disclosed technology comprise the use by humans and use by machines.

Thus the reader will see that at least one embodiment of the disclosed technology provides time-saving, security and peace of mind to its users.

I claim:

1. A method for repeatable creation of a random file, using an alias for creation of said random file, comprising:
   a. receiving at a processor a request to generate said random file, wherein the request comprises said alias;
   b. providing a plurality of key files selected from the group comprising of files generated for a user, said user's files, a third party files and combinations thereof;
   c. providing access by said processor to said key files;
   d. building said random file out of elements selected from the group comprising of whole said key files, pieces of said key files and combinations thereof by adding said elements one by one to said random file, in an order, determined by said alias;
   whereby, said method will always generate the same said random file for the same said alias, providing the same set of said key files is used, achieving repeatable generation of random files in a repeatable manner.

2. The method of claim 1, wherein said key files, before processing, are shuffled in an order, which is determined by said alias;
   whereby, said method will always generate the same said random file for the same said alias, providing the same set of said key files is used, achieving controllable generation of random files in a repeatable manner, and the shuffling of said key files will increase randomness of said random file.

3. The method of claim 1, wherein said random file is used to generate a random sequence of characters, comprising:
   a. hashing said random file with a hashing function;
   b. receiving said random sequence of characters as the result of said hashing function;
   whereby, said method will always generate the same said random sequence of characters for the same said alias, providing the same set of said key files is used, and the same hashing function is used, achieving generation of random sequence of characters in a repeatable manner.

4. The method of claim 3, wherein said random sequence of characters is localized to a character set, comprising:
   a. using said character set;
   b. converting said random sequence of characters into said character set by;
      (1) using the hexadecimal values of pairs of characters from said random sequence of characters to map to characters from said character set which numbers correspond to said hexadecimal values;
   whereby, said method will always generate the same said random sequence of characters, for the same said alias, providing the same set of said key files is used, achieving repeatable generation of random sequence of characters in a repeatable manner and containing only characters from said character set.

5. The method of claim 3, wherein said random sequence of characters is localized to the Unicode character set, comprising:
   a. using said Unicode character set;
   b. converting said random sequence of characters into said Unicode character set by;
      (1) using the hexadecimal values of quartets of the characters from said random sequence of characters to map to characters from said Unicode character set which numbers correspond to said hexadecimal values;
   whereby, said method will always generate the same said random sequence of Unicode characters, for the same said alias, providing the same set of said key files is used, achieving repeatable generation of random sequence of Unicode characters in a repeatable manner.

6. The method of claim 4, wherein said random sequence of characters adapted to user requirements and used as a password comprising:
   a. receiving at processor said user requirements for said password, comprising length, character set, characters which must be present in the password, characters which must be excluded from the password;
   b. adjusting said random sequence of characters according to said requirements;
   whereby, said method will always generate the same said password for the same said alias, providing the same set of said key files is used, achieving controllable generation of random passwords in a repeatable manner, even if using a weak passphrase as said alias.

7. The method of claim 6, wherein logging in is automated comprising:
   a. navigating to a resource, which requires to log in;
   b. using said alias, comprising said resource's URL, to generate a password;
   c. using said password to log in;
   whereby, said method will always log a user in, without said user recalling, typing said password.

8. The method of claim 6, wherein creation of user accounts is automated comprising:
   a. navigating to a resource, which requires an account;
   b. using said alias, comprising said resource's URL, to generate a password;
   c. using said password and default user data to create a user account;
   whereby, said method will always create a user account, without said user typing anything.

9. The method of claim 6, wherein a password with an embedded serial number is produced comprising:
   a. providing said alias;
   b. adding to said alias a serial number;
   c. generating said password using said alias;
   whereby, adding said serial number to said alias, will generate said password, with embedded said serial number, giving opportunity to generate multiple passwords for the same alias by changing said serial number.

10. The method of claim 6, wherein a password with an embedded date is produced comprising:
    a. providing said alias;
    b. adding to said alias a date;
    c. generating said password using said alias;
    whereby, adding said date to said alias, will generate said password, with embedded said date, giving opportunity to generate multiple passwords for the same said alias by changing said date.

11. The method of claim 6, wherein secure communications are conducted comprising:
    a. having a message to encrypt;
    b. obtaining an alias for said message;
    c. using said alias to generate a password;
    d. encrypting said message with said password;
    e. sending said encrypted message;
    f. sending said alias, to the receiver of said encrypted message;

whereby, only the party with the same set of said key files will be able to generate said password by using provided said alias, and be able to decrypt said message.

12. The method of claim 11, wherein hierarchical, secure communications conducted by a device, comprising:
a. assigning a level in a group to said device;
b. giving said device a number of key files, corresponding with said level;
whereby, said device will be able to communicate with other devices in said group as with slaves, if it has more key files, as with partners, if it has the same key files, and as with masters, if it has less key files, said device wouldn't be able to communicate with devices outside said group, as they would have different set of key files.

13. The method of claim 5, wherein said random sequence of characters adapted to user requirements and used as a password comprising:
a. receiving at processor said user requirements for said password, comprising length, character set, characters which must be present in the password, characters which must be excluded from the password;
b. adjusting said random sequence of characters according to said requirements;
whereby, said method will always generate the same said password for the same said alias, providing the same set of said key files is used, achieving controllable generation of random passwords in a repeatable manner, even if using a weak passphrase as said alias.

14. The method of claim 13, wherein logging in is automated comprising:
a. navigating to a resource, which requires to log in;
b. using said alias, comprising said resource's URL, to generate a password;
c. using said password to log in;
whereby, said method will always log a user in, without said user recalling, typing said password.

15. The method of claim 13, wherein creation of user accounts is automated comprising:
a. navigating to a resource, which requires an account;
b. using said alias, comprising said resource's URL, to generate a password;
c. using said password and default user data to create a user account;
whereby, said method will always create a user account, without said user typing anything.

16. The method of claim 13, wherein a password with an embedded serial number is produced comprising:
a. providing said alias;
b. adding to said alias a serial number;
c. generating said password using said alias;
whereby, adding said serial number to said alias, will generate said password, with embedded said serial number, giving opportunity to generate multiple passwords for the same alias by changing said serial number.

17. The method of claim 13, wherein a password with an embedded date is produced comprising:
a. providing said alias;
b. adding to said alias a date;
c. generating said password using said alias;
whereby, adding said date to said alias, will generate said password, with embedded said date, giving opportunity to generate multiple passwords for the same said alias by changing said date.

18. The method of claim 13, wherein secure communications are conducted comprising:
a. having a message to encrypt;
b. obtaining an alias for said message;
c. using said alias to generate a password;
d. encrypting said message with said password;
e. sending said encrypted message;
f. sending said alias, to the receiver of said encrypted message;
whereby, only the party with the same set of said key files will be able to generate said password by using provided said alias, and be able to decrypt said message.

19. The method of claim 18, wherein hierarchical, secure communications conducted by a device, comprising:
a. assigning a level in a group to said device;
b. giving said device a number of key files, corresponding with said level;
whereby, said device will be able to communicate with other devices in said group as with slaves, if it has more key files, as with partners, if it has the same key files, and as with masters, if it has less key files, said device wouldn't be able to communicate with devices outside said group, as they would have different set of key files.

20. A method for repeatable creation of a random file, using an alias for creation of said random file, comprising:
a. receiving at a processor a request to generate said random file, wherein the request comprises said alias;
b. providing at least one key file selected from the group comprising of files generated for a user, said user's files, third party files and combinations thereof;
c. providing access by said processor to said key files;
d. building said random file out of pieces of said key files by adding said pieces one by one to said random file, in the order determined by said alias;
whereby, said method will always generate the same said random file for the same said alias, providing the same set of said key files is used, achieving repeatable generation of random files in a repeatable manner.

* * * * *